United States Patent
Steele et al.

(10) Patent No.: US 9,760,894 B2
(45) Date of Patent: Sep. 12, 2017

(54) PROVIDING SYNDICATED CONTENT ASSOCIATED WITH A LINK IN RECEIVED DATA

(75) Inventors: Jay David Steele, Halifax (CA); Niranjan Mayya, Mississauga (CA); Mohan Krishna Rao, Mississauga (CA)

(73) Assignee: BlackBerry Limited, Waterloo, Ontario (CA)

( * ) Notice: Subject to any disclaimer, the term of this patent is extended or adjusted under 35 U.S.C. 154(b) by 921 days.

(21) Appl. No.: 13/097,867

(22) Filed: Apr. 29, 2011

(65) Prior Publication Data

US 2012/0278343 A1  Nov. 1, 2012

(51) Int. Cl.
*G06F 17/30* (2006.01)
*G06Q 30/02* (2012.01)

(52) U.S. Cl.
CPC ....... *G06Q 30/02* (2013.01); *G06F 17/30899* (2013.01)

(58) Field of Classification Search
None
See application file for complete search history.

(56) References Cited

U.S. PATENT DOCUMENTS

| | | | |
|---|---|---|---|
| 2006/0230021 A1* | 10/2006 | Diab et al. | 707/3 |
| 2006/0248209 A1* | 11/2006 | Chiu et al. | 709/231 |
| 2006/0265489 A1* | 11/2006 | Moore | 709/223 |
| 2007/0226734 A1* | 9/2007 | Lin et al. | 717/177 |
| 2007/0250510 A1* | 10/2007 | Nachman | 707/10 |
| 2007/0294646 A1* | 12/2007 | Timmons | 715/864 |
| 2008/0021963 A1 | 1/2008 | Jana | |
| 2008/0098010 A1* | 4/2008 | Ben Asher et al. | 707/100 |
| 2008/0162275 A1* | 7/2008 | Logan et al. | 705/12 |
| 2008/0215675 A1* | 9/2008 | Kaminitz et al. | 709/203 |
| 2009/0005087 A1* | 1/2009 | Lunati et al. | 455/466 |
| 2010/0131455 A1 | 5/2010 | Logan | |
| 2010/0205169 A1 | 8/2010 | Narayan | |
| 2010/0235505 A1* | 9/2010 | Gupta et al. | 709/225 |
| 2011/0137950 A1* | 6/2011 | Deng et al. | 707/794 |
| 2011/0251972 A1* | 10/2011 | Martin | 705/319 |
| 2011/0307473 A1* | 12/2011 | Lampinen et al. | 707/722 |
| 2012/0072494 A1* | 3/2012 | Wong et al. | 709/204 |

FOREIGN PATENT DOCUMENTS

GB  2424501 A  9/2006

OTHER PUBLICATIONS

Yahoo Pipes. https://web.archive.org/web/20090227013622/http://pipes.yahoo.com/pipes/docs?doc=sources. 2009.*

(Continued)

*Primary Examiner* — Syed Hasan
(74) *Attorney, Agent, or Firm* — Trop, Pruner & Hu, P.C.

(57) ABSTRACT

Data is received by a first device from a first source, where the data contains a link to a particular web page. Responsive to the data, a repository of syndicated content items associated with web pages is accessed. If a particular syndicated content item associated with the particular web page is in the repository, the particular syndicated content item is retrieved and provided to a second device for display at the second device.

25 Claims, 10 Drawing Sheets

(56) References Cited

OTHER PUBLICATIONS

FriendFeed. https://web.archive.org/web/20100424045304/http://friendfeed.com/about/help. 2010.*

YouTube. "Learn How to Build a Pipe in Just a Few Minutes on Yahoo!,"—YouTube. Jul. 14, 2009. Retrieved from http://www.youtube.com/watch?v=J3tS_DkmbVA.*

Flipboard, Inc., http://Flipboard.com—Flipboard for iPad—A New Approach to Browsing Social Content: Flipboard Pages dated on or before Mar. 17, 2011 (4 pages).

Liz Gannes, http://networkeffect.allthingsd.com—All Things Digital—Flipboard Caves to User Demand: Adds RSS Feeds (and Flickr and Web Previews) dated on or before Dec. 2010 (1 page).

www.webreference.com—Introduction to RSS—WebReference.com dated Apr. 2003 (2 pages).

IPTC—Guide for Implementers, IPTC Standards, Document Revision 3.1, Mar. 2011 (250 pages).

Danny Sullivan, http://searchenginewatch.com—Making an RSS Feed—Search Engine Watch dated Apr. 2003 (6 pages).

Wikipedia, http://en.wikipedia.org—NewsML-G2 dated Nov. 2010 (1 page).

Wikipedia, http://en.wikipedia.org—NewsML dated Feb. 2011 (1 page).

Wikipedia, http://en.wikipedia.org—RDF Feed dated on or before Jul. 2010 (2 pages).

W3C—http://www.w3.org/TR/rdf-primer/—RDF Primer—W3C Recommendation Feb. 2004 (1 page).

Wikipedia, http://en.wikipedia.org—Resource Description Framework dated Feb. 2011 (12 pages).

M. Nottingham et al., Network Working Group—Request for Comments: 4287—The Atom Syndication Format dated Dec. 2005 (41 pages).

Wikipedia, http://en.wikipedia.com—RSS dated Feb. 2011 (7 pages).

http://searchenginewatch.com/—RSS: Your Gateway to News & Blog Content dated Apr. 2003 (6 pages).

http://rss.softwaregarden.com—What is RSS: A tutorial introduction to feeds and aggregators dated Jul. 2004 (4 pages).

European Patent Office, Search Report for Appl. No. EP11171165.1, dated Oct. 6, 2011 (6 pages).

European Patent Office, EP Appl. No. 11171165.1 Examination Report dated Jul. 12, 2013, pp. 1-5.

Canadian Patent Office, Examination Report dated Sep. 17, 2013 for Canadian Application No. 2,743,854 (4 pages).

European Patent Office, Result of Consultation dated Oct. 14, 2013 for EP Appl. No. 11171165.1 (3 pages).

Canadian Patent Office, Examination Report dated Sep. 29, 2014 for Canadian Application No. 2,743,854 (3 pages).

Canadian Patent Office, Examination Report dated Dec. 2, 2016 for Canadian Application No. 2,743,854 (4 pages).

Canadian Patent Office, Examination Report dated Nov. 16, 2015 for Canadian Application No. 2,743,854 (4 pages).

* cited by examiner

PROVIDING SYNDICATED CONTENT ASSOCIATED WITH A LINK IN RECEIVED DATA

BACKGROUND

Users of various electronic devices are able to receive data from many different sources. For example, the received data can be in the form of messages or other data streams from social networking sites. Often, the received data from social networking sites may include links to web pages. A user interface of the electronic device may allow selection of the links in order to navigate to respective websites and to view the respective web pages.

BRIEF DESCRIPTION OF THE DRAWINGS

Some embodiments are described with respect to the following figures, in which like reference numerals throughout the figures refer to substantially similar items.

DETAILED DESCRIPTION

Figure 1:
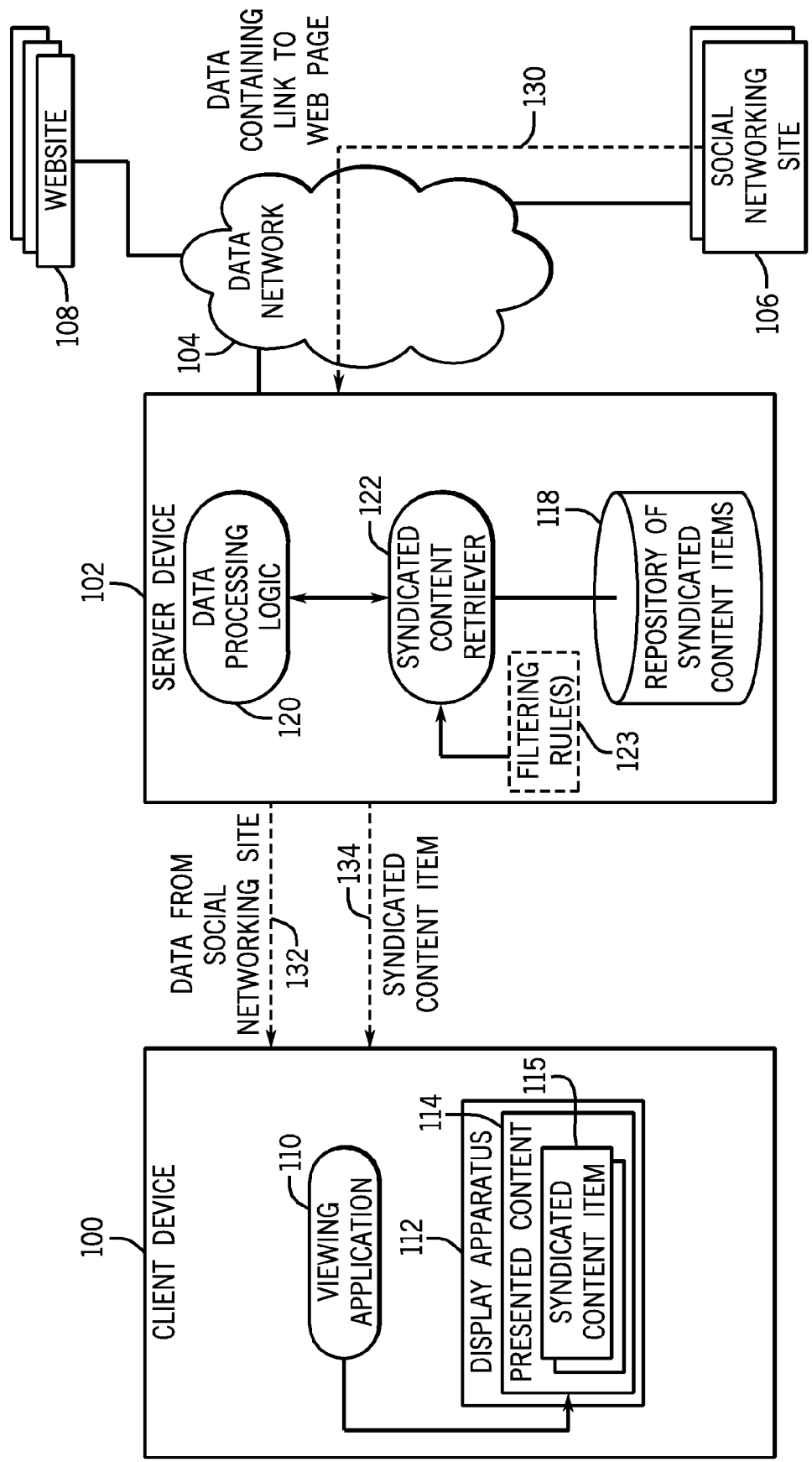
FIGS. 1 and 3 are block diagrams of example arrangements that include a client device and a server device, in accordance with various embodiments.

Users of social networking sites (including, but not limited to, Facebook™, Twitter™, or any social media capable of sending messages having links) can send brief snippets of text to other users. Some social networking sites may specify limits on the number of characters that can be included in each message that can be sent to recipients. In some social networking messages, the sender may include a link (often in the form of a Uniform Resource Identifier or URI) in the message, to allow the recipient to navigate to the corresponding web page. Often the web page identified by the link (also referred to as a "linked web page") may be defined by a markup language such as the Hypertext Markup Language (HTML). In this description, the terms Uniform Resource Identifier (URI), Uniform Resource Locator (URL), and link are used interchangeably to refer to an identification of a resource located on a network.

Over the course of a day or other time interval, a user can receive a relatively large number of social networking messages. Also, in addition to social networking data, users often are also interested in other sources of information, including information from news websites, travel websites, blogs, and so forth. For enhanced user experience, it may be desirable to collect such information from various sources and present to the user in an integrated manner.

If received data, which can include data in a social networking message or data from another source, contains a link to a web page, it may be desirable to present the recipient with content associated with the link rather than just the link without content. In some implementations, it may be possible to scan a web page (referred to by the link) to extract certain content (such as by copying a portion of the web page) to provide a summary or other representation of the web page—such a process that involves scanning and extraction is sometimes referred to as a "scraping" process (also referred to as "harvesting" or "web data extraction"). However, scraping a web page can be associated with copyright issues or can violate terms of service set by a provider or publisher of the web page. Furthermore, scraping may involve complex and time consuming algorithms to parse the web page and determine, based on unpredictable web page markup, which portion of the web page to extract.

In accordance with some embodiments, to allow for presentation of "richer" content in response to receiving data containing a link to a web page, techniques or mechanisms are described so as to provide syndicated content associated with the web page referred to by the link. "Syndicated content" refers to content created by an author, publisher, or other content provider that is associated with a corresponding web page, where the syndicated content is intended for redistribution to recipients who are interested in the content portion of a web page. By providing syndicated content to a user rather than a summary or other representation generated by performing scraping, issues associated with copyright or terms of use violations are avoided, since the identified syndicated content is specifically provided by the author, publisher, or other content provider for redistribution to recipients. Furthermore, syndicated content is provided by the author, publisher, or other content provider in the manner intended by the author, publisher, or other content provider, while scraping may produce representations of the content not intended or approved by the author, publisher, or content provider.

Examples of syndicated content include any one or more of the following: a Really Simple Syndication (RSS) feed; an Atom feed (also referred to as an Atom Syndication Format feed); a Resource Description framework (RDF) feed; a NewsML feed; syndicated content defined by microformat syntax; or other syndicated content. A version of RSS is described by an RSS Specification published by the RSS Advisory Board. A version of the Atom Syndication Format is described by Request for Comments (RFC) 4287, entitled "The Atom Syndication Format," dated December 2005. A version of RDF is described by a W3C Recommendation, entitled "RDF Primer," dated February 2004. A version of NewsML is described by the NewsML-G2 2.7 standard, published by the International Press Telecommunications Council.

Syndicated content defined by microformat syntax refers to syndicated content defined by specific tags ("microformat tags") within a web page. The microformat tags allow web page content to be easily processed to find information intended for end users, including syndicated content or other types of content (such as contact information, geographic location information, calendar events, or others). One example of a microformat syntax that defines syndicated content is a syntax according to hAtom, which defines hAtom tags that mark up content to specify sections of the content that correspond to Atom feeds (syndicated content).

Syndicated content identified using microformat syntax may be included in a web page. The presence of microformat tags for defining the syndicated content in the web page allows a convenient way for a web page author, publisher, or content provider to identify syndicated content for redistribution to further recipients. In alternative implementations where microformat syntax is not employed, syndicated content can be located using links (e.g. URLs) to such syndicated content. As an example, a web page can contain such URL to its associated syndicated content, and this URL can be retrieved to allow retrieval of the associated syndicated content. As another example, the web page may contain a link (e.g. URL) to a syndicated content "feed" which includes several syndicated content items for the website, including a syndicated content item associated with the web page.

FIG. 1 illustrates an example arrangement according to some embodiments, where the arrangement includes the client device 100 and a server device 102. The client device 100 and the server device 102 are able to communicate with each other over a connection, which can be a wireless connection (e.g. a cellular wireless network, a wireless local area network, etc.) or a wired connection (e.g. local area network, public network such as the Internet, etc.).

Examples of the client device 100 include a computer (e.g. desktop computer, notebook computer, tablet computer), a personal digital assistant (PDA), a mobile telephone, an appliance, or other type of electronic device. The server device 102 can be implemented with various types of computing systems that are well known to persons of skill in the relevant art.

The server device 102 is able to communicate with various remote systems over a data network 104. Examples of the remote systems include social networking sites and websites. In this figure, the server device 102 receives social networking data (shown as arrow 130) from a social networking site 106. In some cases, the social networking data (130) may contain a link to a web page (which can be a web page located at one of the websites, such as website 108). Although reference is made to data received from a social networking site in the present discussion, it is noted that techniques or mechanisms according to some embodiments can also be applied to data received from other sources of information, such as news outlets, blogs, and so forth.

The social networking data 130 (which can contain a link to a web page) is received by data processing logic 120 in the server device 102. The data processing logic 120 can forward (shown by arrow 132) the received social networking data to the client device 100 for presentation at the client device 100 (if desired by a user of the client device 100). A subscription process or user preferences may be used to control which data from the social networking site 106 is reformatted and/or sent to the client device 100.

In accordance with an embodiment of this disclosure, the data processing logic 120 may also forward the link contained in the received social networking data 130 to a syndicated content retriever 122 in the server device 102. The syndicated content retriever 122 is able to access a repository 118 of syndicated content items and determine whether a syndicated content item associated with the web page (referred to by the link in the social networking data 130) is contained in the repository 118. If so, the syndicated content retriever 122 sends the identified syndicated content item (shown by arrow 134) to the client device 100. Although the repository 118 is depicted as being stored in the server device 102, in alternative examples, the repository 118 can actually be stored on a storage system that is separate from the server device 102.

Note that it is possible that the repository 118 of syndicated content items does not contain the syndicated content item associated with the web page referred to by the link in the received social networking data 130. In this scenario, the server device 102 is able to access the website 108 and analyze (e.g. download and parse) the web page referred to by the link in the received social networking data 130. The server device 102 analyzes the web page to identify a syndicated content item associated with the web page. For example, the syndicated content item may be retrieved from the web page (if the syndicated content is identified by microformat tags in the web page), or may be retrieved by using a syndication link to the syndicated content item (where the syndication link can be obtained from the web page). Once the syndicated content retriever 122 obtains the requested syndicated content item, the syndicated content retriever 122 sends the syndicated content item (shown as arrow 134) to the client device 100. Also, when the syndicated content item is retrieved over the network 104, the syndicated content item may also be saved in the repository 118 for future use.

As further shown in FIG. 1, filtering rule(s) 123 may be provided for use by the syndicated content retriever 122 to filter links of incoming data. Not all links may be of interest to a given recipient, so the filtering rule(s) 123 can be applied to select a subset of received links that should be processed for a particular client device 100, so that syndicated content items corresponding to the subset of received links are retrieved by the syndicated content retriever 122 for presentation to the client device 100. The syndicated content items of the remaining links not in the subset are not retrieved and may not be forwarded to the client device 100. Note that in alternative implementations, instead of applying filtering at the server device 102, the filtering can be applied at a remote site, such as a social networking site. In such alternative implementations, a recipient can request that the remote site, such as the social networking site, only send data satisfying particular filtering rule(s) to the recipient. Additional details regarding filtering are discussed further below.

A viewing application 110 in the client device 100 can present received syndicated content items in a display apparatus 112 of the client device 100. As shown in FIG. 1, various syndicated content items 115 are part of presented content 114 in the display apparatus 112. In some implementations, the viewing application 110 can be an application designed to present syndicated content items via a user interface. For example, the viewing application 110 can be an RSS reader or other type of reader for presenting other types of syndicated content items. In some viewing applications, the reader may perform aggregation of syndicated content from several sources. Alternatively, the viewing application 110 can be a web browser. The syndicated content items 115 that are presented by the viewing application 110 can include syndicated content item(s) corresponding to link(s) in received social networking messages, as well as syndicated content item(s) associated with other sources (e.g. news sites, blogs, etc.). Such aggregation of syndicated content items provides a convenient mechanism of presenting information to the user, who does not have to sift through information from different sources in different views. It should be understood that design aspects and user interface components of the viewing application 110 may present the syndicated content item in a variety of different ways without altering the scope of the present disclosure.

If desired by a user of the client device 100, social networking data (132) received at the client device 100 can also be presented for display, such as by the viewing application 110 or another application. For example, the social networking data may be optionally displayed with or without the syndicated content items based on an application setting or user preference.

Figure 2A:
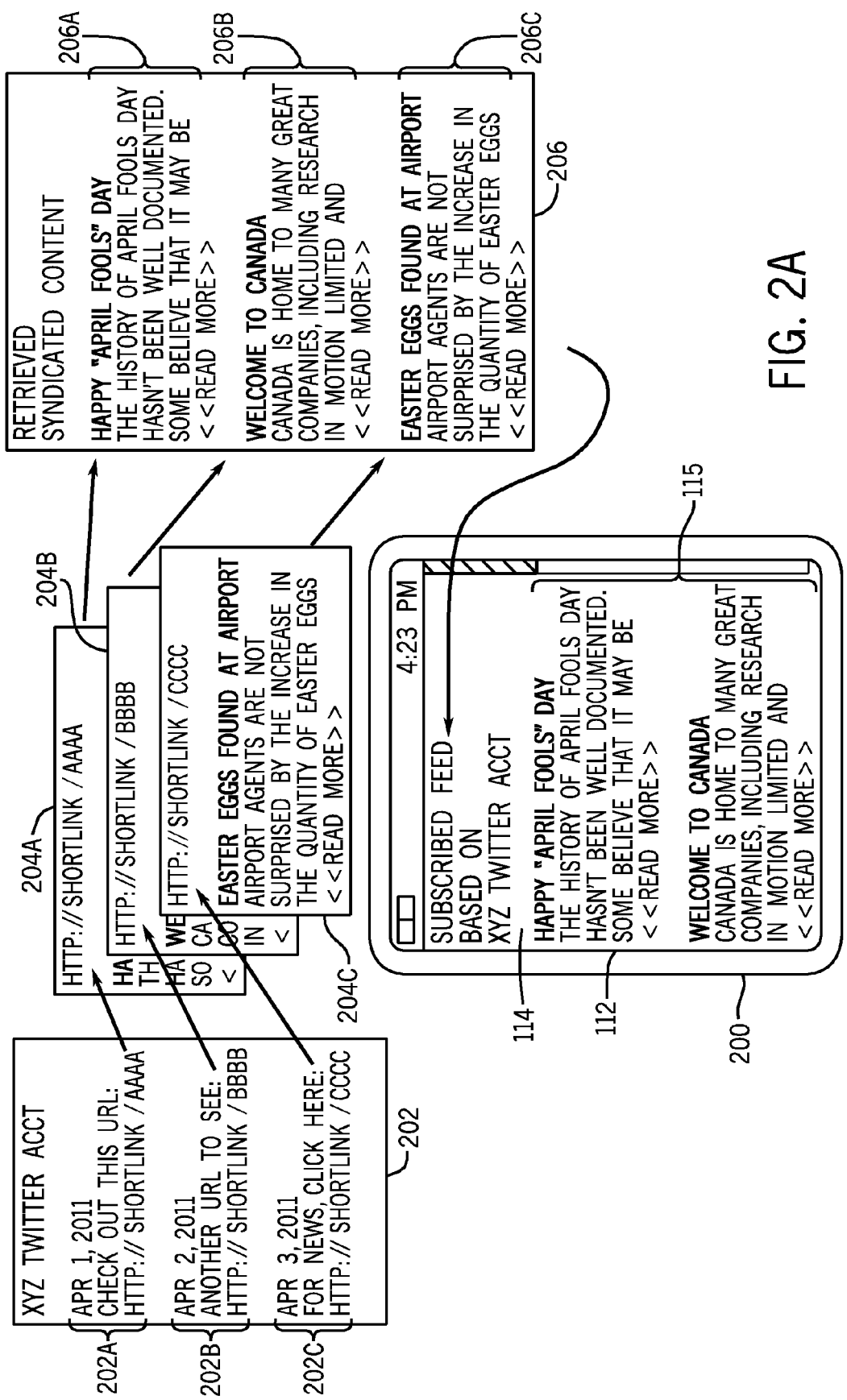
FIGS. 2A-2B illustrate the retrieval and display of syndicated content associated with links in received data, in accordance with various examples.

FIG. 2A illustrates an example in which a syndicated content feed may be generated based upon links to web pages that are received in social networking messages. In FIG. 2A, various messages 202A, 202B, and 202C are received from a social networking account 202 (e.g. a "Twitter" account). In the example, social networking account 202 is associated with user "XYZ." In the example of FIG. 2A, it is assumed that an electronic device 200 (e.g. similar to client device 100 of FIG. 1) has registered an interest in receiving a data feed based on messages from XYZ's social networking account 202. In accordance with an embodiment of this disclosure, a server device 102 (not shown in FIG. 2A) processes received messages from XYZ's social networking account 202 to generate a syndicated content feed based on the social networking account 202. Therefore, the server device 102 may process the received messages 202A, 202B, and 202C in order to generate the syndicated content feed.

In the example, each of the received messages 202A, 202B, and 202C include a respective URL, where the URLs refer to respective web pages 204A, 204B, and 204C that can be located at various websites. Effectively, the received messages include a stream of URLs. In other examples, only some of the messages may include URLs, or there may be additional content included that is forwarded to the electronic device 112. For the description of this example, the messages 202A, 202B, and 202C received from the social networking account 202 include a stream of URLs.

Based on the received messages 202A, 202B, and 202C, the syndicated content retriever 122 (not shown in FIG. 2A) as described in FIG. 1 retrieves respective syndicated content items 206A, 206B, and 206C. Each of the syndicated content items 206A, 206B, and 206C can be retrieved from the repository 118 of FIG. 1 or from a remote site. In the example of FIG. 2A, each syndicated content item 206A, 206B, or 206C contains a user selectable link (represented as "<<Read More>>") that can be selected by a user to retrieve further information, such as the corresponding web page or full news article.

It should be understood that syndicated content retriever 122 does not simply use a scraping process to retrieve the syndicated content items. Rather, the syndicated content retriever 122 may inspect the web page associated with the link to determine if a syndicated content item is available—either from the repository of syndicated content items or via a further link on the web page. Although respective web pages 204A, 204B, and 204C, associated with respective links in messages 202A, 202B, and 202C, are depicted as short articles, it is understood that the web pages may in fact be very different from the retrieved syndicated content items 206A, 206B, and 206C that are associated with the web page.

The retrieved syndicated content 206 (including the items 206A, 206B, and 206C) can be provided to the electronic device 200 for display as displayed syndicated content items 115 in the display apparatus 112.

Figure 2B:
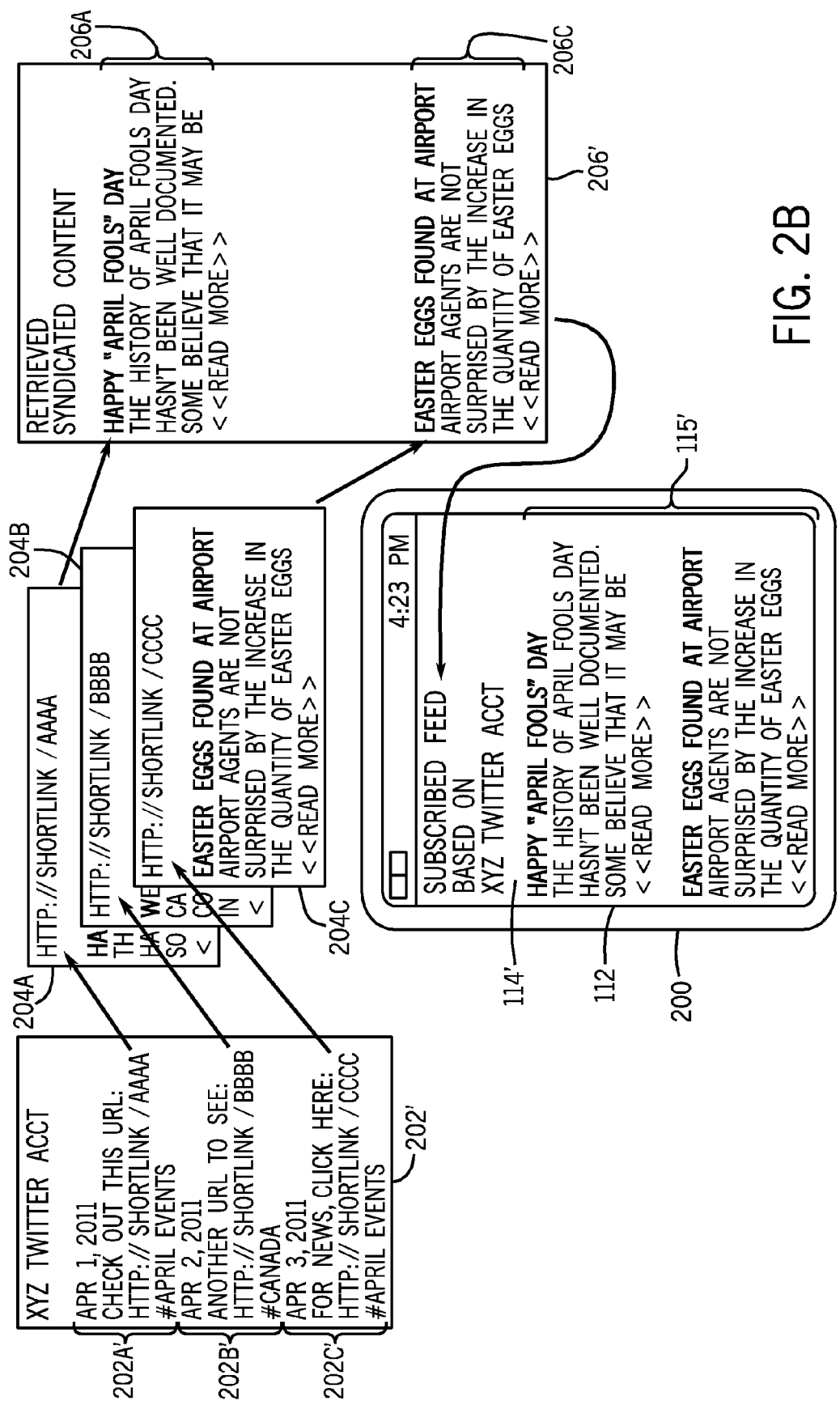

As noted above in connection with FIG. 1, filtering rule(s) 123 can be used by the syndicated content retriever 122 to identify a subset of links within an incoming stream of links that are of interest to a particular recipient associated with electronic device 200. The filtering rule(s) 123 can be applied based on metadata contained in a received data, where the metadata is associated with the corresponding links. For example, as shown in FIG. 2B, the metadata in received messages 202A', 202B', and 202C' of a social networking account 202' can be in the form of hashtags, indicated by the symbol "#" in some examples. Each of the messages 202A' and 202C' contains a respective hashtag entry "#April Events" to indicate that the link included in each respective message is in the "April Events" category. In the example given in FIG. 2B, the April Events include April Fools day and Easter that are the subject of the links in the messages 202A' and 202C', respectively. The hashtag entry in the message 202B' is "#Canada" to indicate that the link contained in the message 202B' is in the "Canada" category.

Instead of using hashtags, other types of metadata can be included in social networking messages (or data from other sources)—the filtering rule(s) 123 can also be applied against such other types of metadata to select a subset of links of interest. An example of another type of metadata includes location information that may be included in or associated with a message in the social networking account. For example, the location information may include longitude and latitude values that indicate the approximate geographic location from which the message was sent via the social networking account. For example, a recipient who is receiving messages from the social networking account may only be interested in messages that are sent from within a geographic range associated with the recipient.

In the example of FIG. 2B, the filtering rule(s) 123 can specify that the given user is interested in information relating to the "April Events" category, but is not interested in other types of information (such as the "Canada" category). As a result, when the filtering rule is applied against the hashtags contained in the social networking messages 202A', 202B', and 202C', the syndicated content retriever 122 filters out the link contained in the message 202B', and retrieves just syndicated content items 206A and 206C relating to the selected subset of messages 202A' and 202C'. The retrieved subset of syndicated content items 206A and 206C (which does not include item 206B) are sent to the client device 100 for display as displayed syndicated content items 115' in presented content 114'.

In an example where the metadata includes location information, the filtering rule(s) 123 can be used to specify that links of interest to a given user are those associated with certain locations. In this case, the syndicated content retriever 122 retrieves just syndicated content items associated with received links associated with location information that indicates locations that match predefined locations, geographic relationship to the location of the electronic device 200, nationality, or other classes of locations that are known in the art of location based filtering.

In addition, it is possible for links of received data to be associated with multiple types of metadata. In such examples, the filtering rule(s) 123 can be applied against a combination of the different types of metadata, such as a combination of category and location information. Other filtering rule(s) or metadata may be used with various embodiments of the present disclosure. For example, a filtering rule may be based upon the media type of the content which is associated with respective web pages—such that a generated syndicated content feed may include only video syndicated content, audio podcasts, or text based news articles.

As noted above, in alternative implementations, instead of applying filtering at the server device 102, the filtering can be applied at a remote site, such as a social networking site. For example, a recipient at the client device 100 (FIG. 1) may request that the social networking site send only social networking messages to the recipient that are in the "April Events" category—in other words, the recipient is able to submit the filtering rule(s) to the social networking site (such as by updating the recipient's settings or preferences at the social networking site for example). In the above example, the only messages downloaded to the server device 102 for delivery to the client device 100 would be messages having #April Events hashtag entries.

Figure 3:
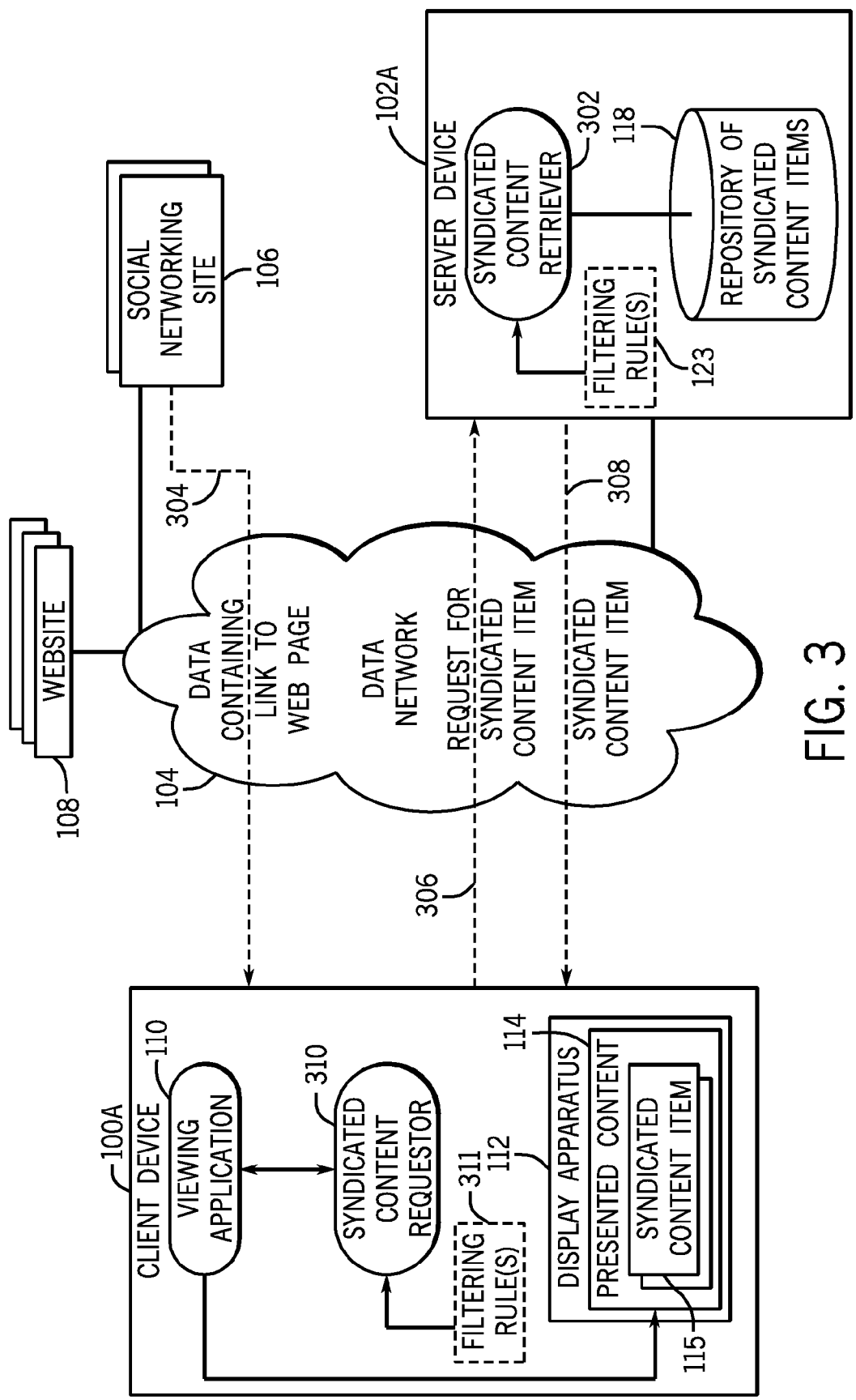

FIG. 1 depicts an arrangement in which input data for the client device 100 is first received by the server device 102 and then propagated to the client device 100. In alternative implementations, as shown in FIG. 3, a client device 100A can receive input data over the network 104 from the social networking sites 106, where such input data does not have to first pass through a server device 102A. In FIG. 3, the client device 100A is able to receive social networking data (shown as arrow 304) from a social networking site 106, where the social networking data 304 contains a link to a web page. The client device 100A includes the viewing application 110 as well as a syndicated content requester 310 that is able to request syndicated content in response to receipt of the social networking data 304. The syndicated content requester 310 sends a request (shown as arrow 306) for syndicated content to the server device 102A. The request (306) for syndicated content can simply include the link that is contained in the social networking data (304) as received by the client device 100A, along with an indication that the request (306) is for syndicated content associated with the web page referred to by the link. Alternatively, the request (306) may include portions of the social networking data 304 which contain the link.

The server device 102A includes a syndicated content retriever 302 which operates very similar to syndicated content retriever 122 described in FIG. 1. The syndicated content retriever 302, upon receiving the request (306) for syndicated content, accesses the repository of syndicated content items 118 to determine whether a syndicated content item associated with the web page referred to by the link in the received social networking data (304) is contained in the repository 118. If so, the syndicated content retriever 302 retrieves the identified syndicated content item from the repository 118 and sends (shown by arrow 308) the identified syndicated content item to the client device 100A, so that the identified syndicated content item can be displayed in the display apparatus 112 of the client device 100A.

Note that it is possible that the repository of syndicated content items 118 does not contain the syndicated content item requested by the request 306. In this scenario, the server device 102A is able to access (at the respective website 108) the web page referred to by the link contained in the social networking data 304 to locate a syndicated content item associated with the web page. The syndicated content retriever 302 obtains the located syndicated content item over the data network 104 and then sends the syndicated content item (308) to the client device 100A. Also, the syndicated content item retrieved over the network 104 can also be saved in the repository 118 for future use.

In some implementations according to FIG. 3, the syndicated content retriever 302 can optionally apply filtering rule(s) 123 against metadata associated with links in received data in similar fashion as the syndicated content retriever 122 of FIG. 1. Alternatively, instead of applying filtering by the syndicated content retriever 302 in the server device 102A, filtering can be applied by the syndicated content requester 310 in the client device 100A, based on filtering rule(s) 311 in the client device 100A. Alternatively, filtering can be applied at the remote site delivering the data to the client device 100A. The syndicated content requester 310, in implementations where filtering is applied at the client device 100A, would apply the filtering rule(s) 311 against metadata (e.g. hash tags, location information, etc.) associated with received links to identify a subset of the links that are of interest. As a result, any requests (306) for syndicated content sent by the syndicated content requester 310 are requests for syndicated content associated with the subset of links (in other words, the requests sent by the syndicated content requester 310 would not include seek syndicated content for links not in the subset).

Figure 4:
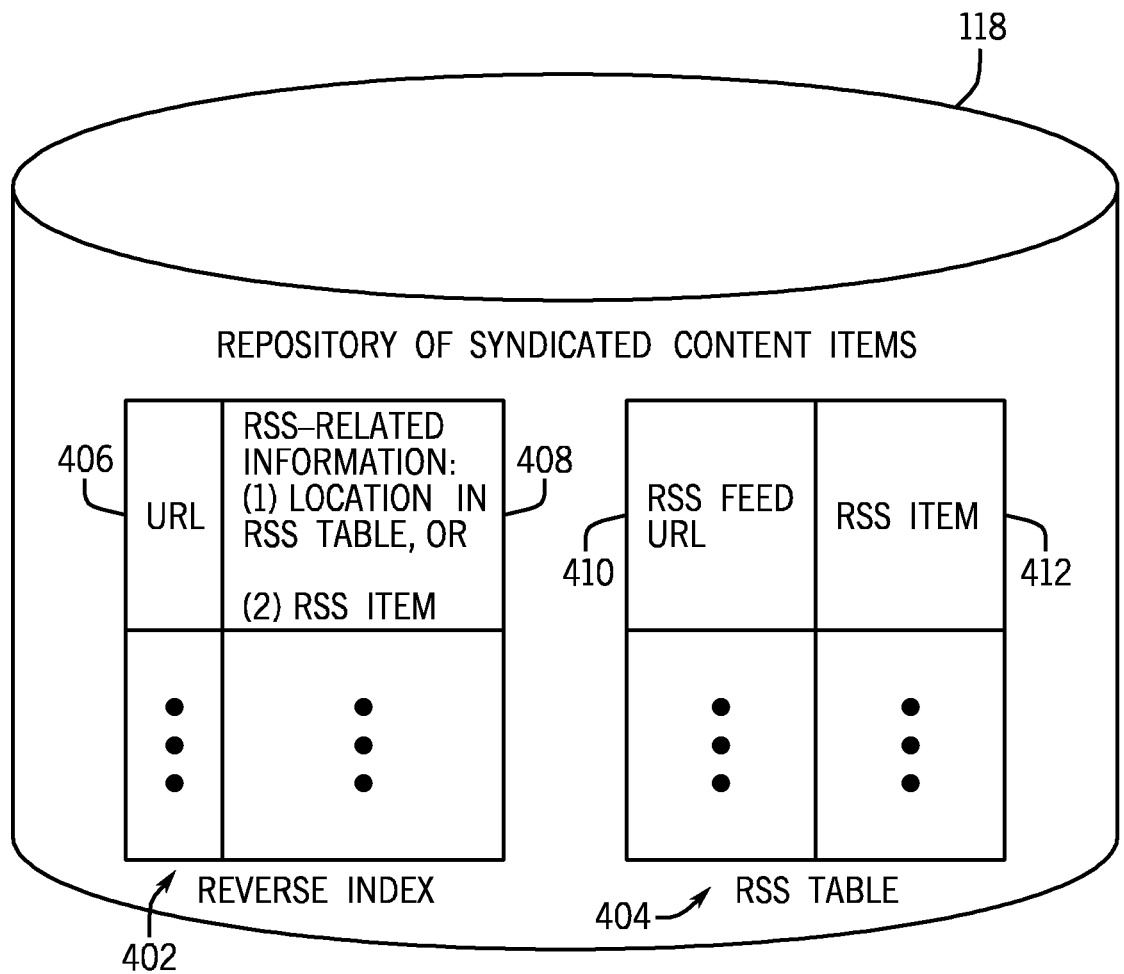
FIG. 4 is a schematic diagram of content of a repository of syndicated content items, according to some implementations.

FIG. 4 shows an example implementation of the repository of syndicated content items 118. The repository 118 includes a reverse index 402 and an RSS table 404. In the example of FIG. 4, it is assumed that the syndicated content items of the repository 118 are RSS feeds. However, similar data structures can be provided for syndicated content items according to other formats.

The reverse index 402 maps links 406 (e.g. URLs) to RSS-related information 408. The links 406 are links to web pages. The RSS-related information 408 can include either (1) a location in the RSS table 404, or (2) an RSS item (i.e. an RSS feed). Each entry of the RSS table 404 maps an RSS feed URL 410 to an RSS item 412. The RSS feed URL 410 is a URL to an RSS feed.

In implementations where the RSS-related information 408 in the reverse index 402 includes a respective location in the RSS table 404, accessing the reverse index 402, based on a URL to a web page (such as a URL contained in received social networking data), produces a corresponding location in the RSS table 404. Such location of the RSS table 404 is then accessed by the syndicated content retriever 122 or 302 (FIG. 1 or 3, respectively), to retrieve the respective RSS item 412. As examples, the RSS item can include information such as a title, a short summary, a publisher, publication date, and so forth.

In alternative implementations, instead of referring to locations in the RSS table 404, the RSS-related information 408 can include the RSS item corresponding to the respective URL in the reverse index 402. In such implementations, the syndicated content retriever 122 or 302 uses a URL in received data to map to an entry of the reverse index 402. The accessed entry of the reverse index 402 contains the corresponding RSS item, which is retrieved by the syndicated content retriever 122 or 302. In implementations where the RSS-related information 408 in the reverse index 402 contains the RSS item, the RSS table 404 does not have to be accessed. In fact, in such implementations, the RSS table 404 can be omitted.

It should be understood that while reverse index 402 and RSS table 404 are depicted in FIG. 4 as tables in the repository 118, the tables may be stored in separate repositories, both accessible by the server device. Furthermore, the data described as tables may be stored in various memory structures commonly associated with storing data, including various types of databases.

Figure 5A:
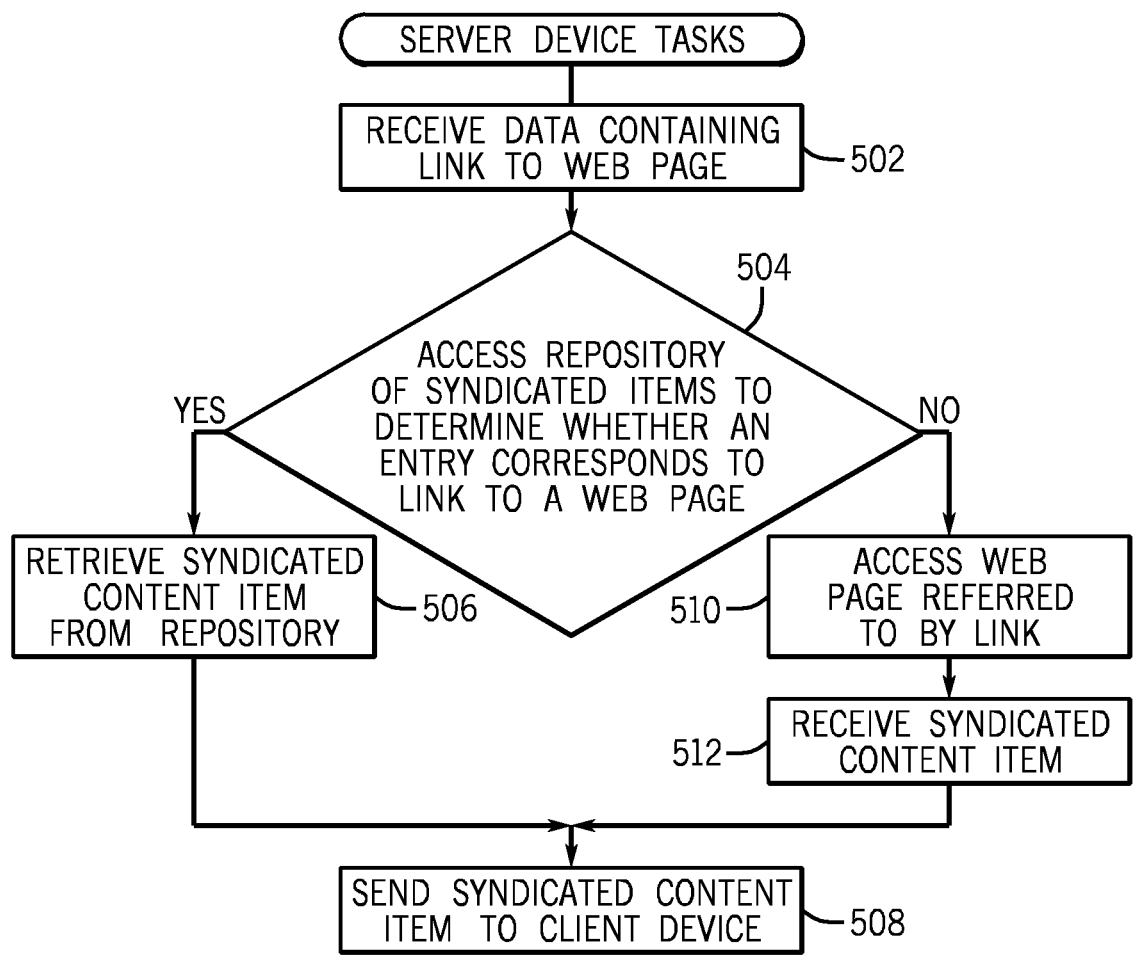
FIGS. 5A-5B are flow diagrams of processes performed by server devices to output syndicated content, in accordance with various embodiments.

FIG. 5A is a flow diagram of tasks performed by the server device 102 of FIG. 1. The server device 102 receives (at 502) data containing a link to a web page. If the link is in the form of a shortened URL, the server device 102 can convert the received URL to a full URL. To un-shorten a shortened URL, the server device 102 can access a shortening service to obtain the corresponding full URL.

The syndicated content retriever 122 in the server device 102 then accesses (at 504) the repository of syndicated content items 118 to determine whether or not an entry corresponds to the received link. If the syndicated content retriever 122 determines (at 504) that an entry exists in the repository 118 ("YES" branch), then the syndicated content retriever 122 retrieves (at 506) the respective syndicated content item from the repository 118 and sends (at 508) the retrieved syndicated content item to the client device 100.

On the other hand, if the syndicated content retriever 122 determines that there is no entry in the repository 118 corresponding to the received link ("NO" branch from 504), then the syndicated content retriever 122 causes the server device 102 to access (at 510) the web page (located at a corresponding website) referred to by the link to obtain information relating to the corresponding syndicated content item. The target syndicated content item in some implementations can be contained in the accessed web page, such as when the syndicated content item is identified by microformat tags in the web page. Alternatively, the accessed web page can include a link to the syndicated content item, which the syndicated content retriever 122 can follow to retrieve the syndicated content item. The syndicated content retriever 122 receives (at 512) the syndicated content item over the data network 104, after which the server device 102 sends (at 508) the received syndicated content item to the client device 100 for display.

Figure 5B:
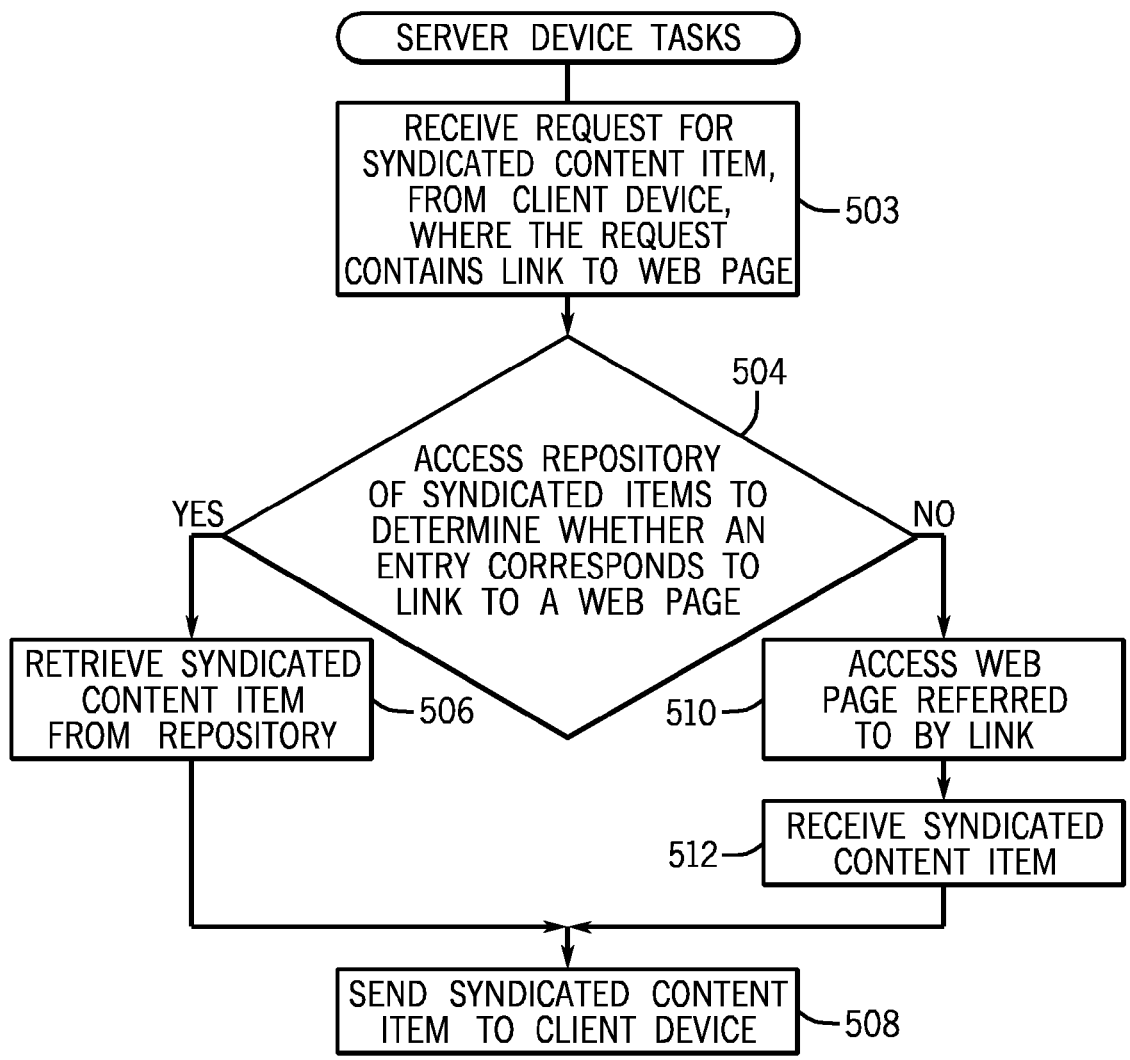

FIG. 5B is a flow diagram of tasks performed by the server device 102A of FIG. 3, according to alternative implementations. The server device 102A receives (at 503) a request for syndicated content that is based on a web page referred to by a link in data received by the client device 100A of FIG. 3. As discussed above in connection with FIG. 3, such request is submitted by the syndicated content requester 310 of FIG. 3.

The remaining tasks of FIG. 5B are performed in response to the request, and are similar to corresponding tasks of FIG. 5A. These remaining tasks of FIG. 5B are assigned the same reference numerals as in FIG. 5A.

Figure 6:
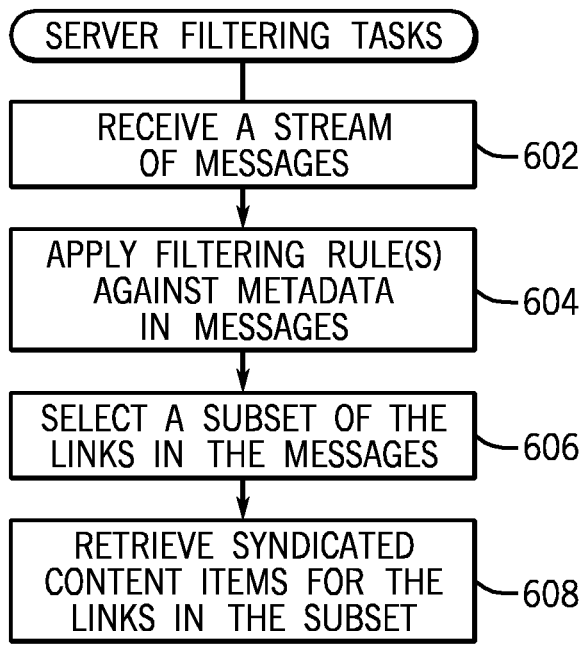
FIG. 6 is a flow diagram of a filtering process, according to further embodiments.

FIG. 6 is a flow diagram of filtering tasks that can be performed by the syndicated content retriever (122 or 302) at the server device (102 or 102A, respectively, in FIG. 1 or 3). The syndicated content retriever receives (at 602) a stream of messages (e.g. social networking messages) containing respective links to web pages. Next, the syndicated content retriever applies (at 604) the filtering rule(s) 123 (FIG. 1 or 3) against metadata (e.g. hashtags, location information, etc.) associated with the links contained in each of the messages. Based on application of the filtering rule(s) 123 against the metadata of the messages, a subset (less than all) of the links is selected (at 606). The syndicated content retriever then retrieves (at 608) the syndicated content items for just the links in the subset.

Figure 7:
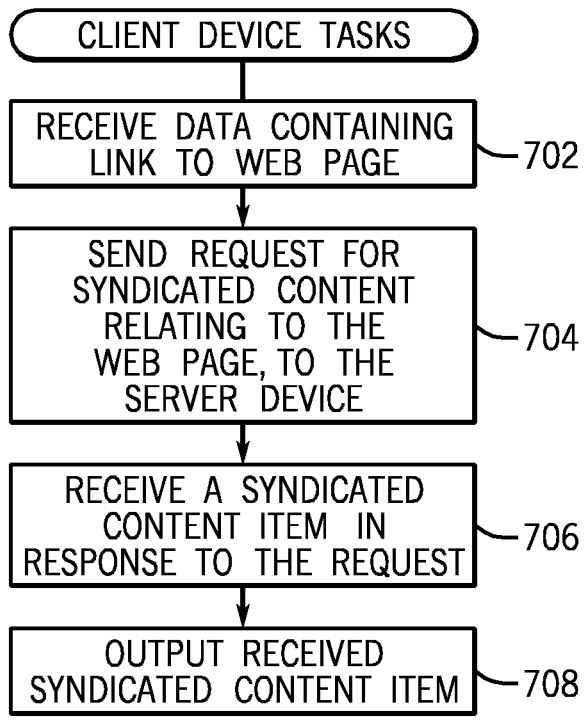
FIG. 7 is a flow diagram of a process performed by a client device, in accordance with some embodiments.

FIG. 7 is a flow diagram of tasks performed by the client device 100A of FIG. 3. The client device 100A receives (at 702) data containing a link to a web page. For example, the data can be social networking data from a social networking site 106 (FIG. 1).

In response to the received data, the syndicated content requester 310 in the client device 100 sends (at 704) a request (e.g., 306 in FIG. 3) for syndicated content associated with the web page, to the server device 102A.

The syndicated content requester 310 then receives (at 706) a syndicated content item retrieved by the syndicated content retriever 302 in the server device 102A in response to the request. The received syndicated content item is output (at 708) for display by the client device 100A.

Figure 8:
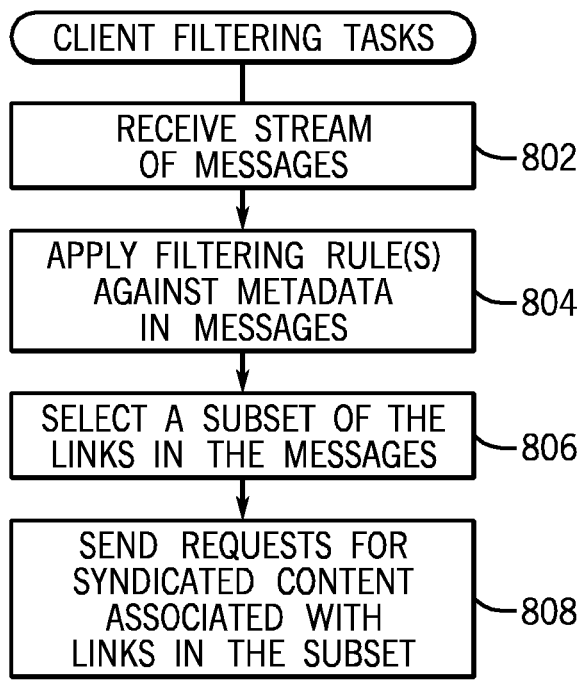
FIG. 8 is a flow diagram of a filtering process performed by a client device, in accordance with alternative embodiments.

FIG. 8 is a flow diagram of filtering tasks that can be performed by the syndicated content requester 310 at the client device 100A of FIG. 3, in accordance with alternative implementations. The syndicated content requester 310 receives (at 802) a stream of messages (e.g. social networking messages) containing respective links to web pages. Next, the syndicated content retriever applies (at 804) the filtering rule(s) 311 (FIG. 3) against metadata (e.g. hashtags, location information, etc.) associated with the links contained in each of the messages. Based on application of the filtering rule(s) 311 against the metadata of the messages, a subset (less than all) of the links is selected (at 806). The syndicated content requester 310 then sends (at 808) one or more requests for the syndicated content items for just the links in the subset, to the server device 102A.

Figure 9:
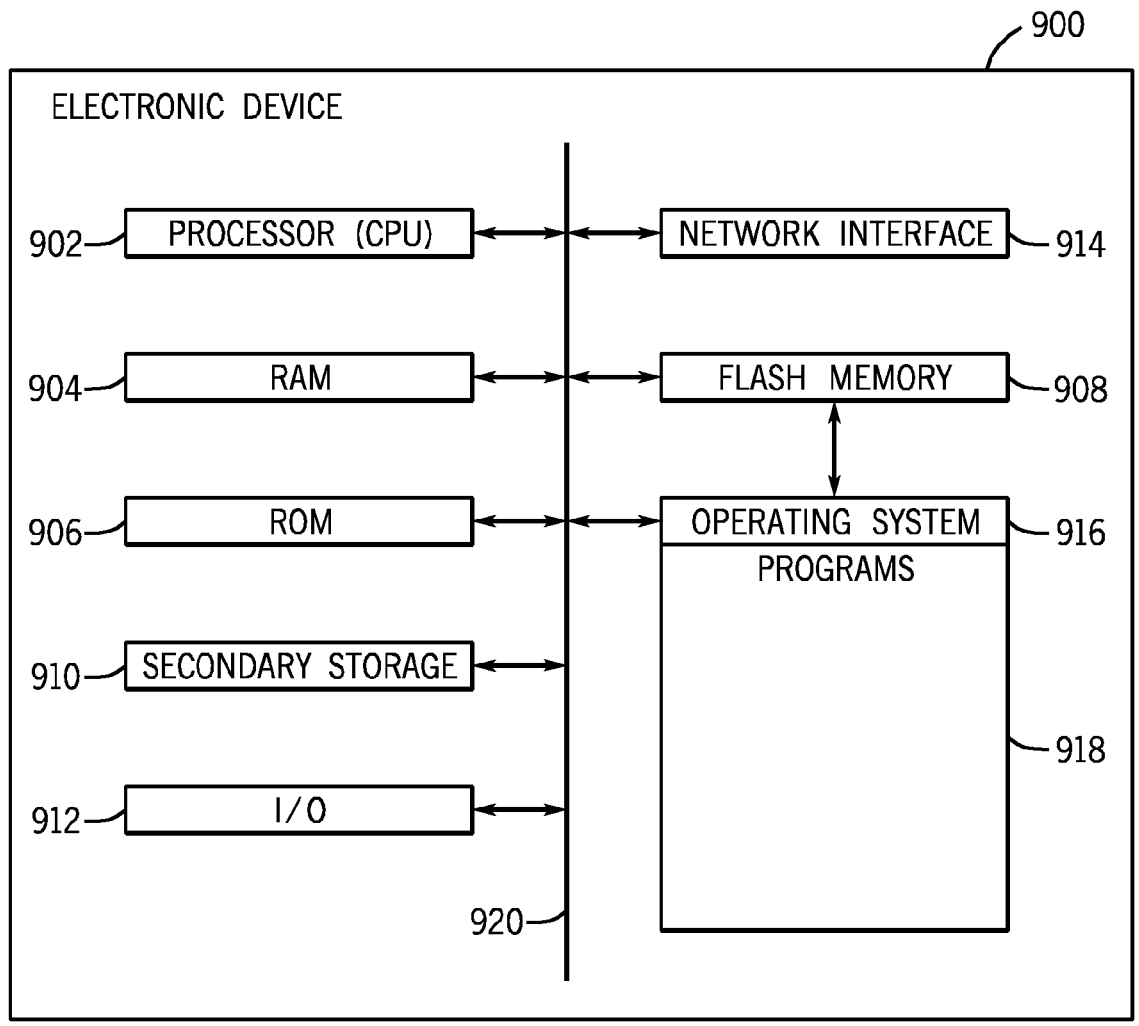
FIG. 9 is a block diagram of components of an electronic device that is able to incorporate some embodiments.

FIG. 9 illustrates an example arrangement of an electronic device 900, which can be used to implement a client device or a server device (100, 100A, 102, or 102A in FIG. 1 or 3). The electronic device 900 includes a processor (or multiple processors) 902 and various types of storage devices, including one or more of a random access memory (RAM) 904, a read-only memory (ROM) 906, a flash memory 908, and a secondary storage device 910 (such as a disk-based secondary storage device). A processor can include a microprocessor, microcontroller, processor module or subsystem, programmable integrated circuit, programmable gate array, or another control or computing device.

The electronic device 900 also includes one or more input/output (I/O) devices 912 (e.g. user input devices, I/O port interfaces, etc.) and a network interface 914 to allow the electronic device 900 to communicate with another system. The network interface 914 is able to perform wireless or wired communications.

The various hardware components (e.g. 902, 904, 906, 908, 910, 912, and 914) of the electronic device 900 are coupled to an interconnect 920, which can represent one or multiple buses of the electronic device 900.

The electronic device 900 also includes an operating system 916, which can be initially stored on the flash memory 908 or on the secondary storage device 910 or on another storage device. The operating system 916 can be loaded for execution on the processor(s) 902. Additionally, other software layers of the electronic device 900 include various programs 918, such as various modules 110, 120, 122, 302, 310 depicted in FIG. 1 or 3.

Machine-readable instructions of software layers in the electronic device 900 can be stored in various computer-readable or machine-readable storage media, including those shown in FIG. 9, as well as removable storage media. Such computer-readable or machine-readable storage medium or media is (are) considered to be part of an article (or article of manufacture).

In alternative embodiments, a method of a server device comprises receiving from a client device a request for syndicated content based on a web page referred to by a link in data received by the client device. Responsive to the request for the syndicated content, a repository of syndicated content items is accessed to locate a particular syndicated content item associated with the particular web page identified by the link. If the particular syndicated content item associated with the web page is in the repository, the particular syndicated content item is retrieved and provided to the client device for display at the client device.

In further embodiments, a server device has an interface to receive a request from a client device, where the request is for syndicated content based on a web page referred to by a link in data received by the client device. Responsive to the request for the syndicated content, at least one processor of the server device is operable to access a repository of syndicated content items to locate a particular syndicated content item associated with the particular web page identified by the link. If the particular syndicated content item associated with the web page is in the repository, the at least one processor is operable to retrieve the particular syndicated content item and provide the particular syndicated content item to the client device for display at the client device.

In yet further embodiments, a client device comprises a network interface to receive data from a first source, the data including a link identifying a particular web page. The client device includes at least one processor operable to send a request for syndicated content relating to the particular web page, to a server device having access to a repository of syndicated content items associated with respective web pages. The at least one processor is operable to further receive a syndicated content item associated with the particular web page, and output the received syndicated content item for display.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method of a first device, comprising:
receiving data over a network from a second device, where the data contains a link identifying a particular web page;
accessing a repository of syndicated content items associated with respective web pages to locate a particular syndicated content item associated with the particular web page identified by the link, the repository mapping the syndicated content items to the respective web pages, the syndicated content items being according to a syndicated content format; and
if the particular syndicated content item associated with the particular web page is in the repository, retrieving the particular syndicated content item from the repository, where the particular syndicated content item is according to the syndicated content format, and sending the retrieved particular syndicated content item to a third device for display at the third device, wherein the first, second, and third devices are separate devices.

2. The method of claim 1, wherein the particular syndicated content item comprises one of a Really Simple Syndication (RSS) feed, an Atom feed, a Resource Description framework (RDF) feed, and a NewsML feed.

3. The method of claim 1, wherein receiving the data from the second device comprises receiving the data from a social networking site.

4. The method of claim 1, wherein receiving the data containing the link comprises receiving the data containing an identification of a resource located on the network.

5. The method of claim 1, wherein the received data includes metadata associated with the link, the method further comprising:
applying at least one filtering rule against the metadata; and
determining that syndicated content is to be retrieved for the link based on applying the at least one filtering rule against the metadata.

6. The method of claim 5, wherein the metadata includes at least one selected from among: information indicating a category of information associated with the link, and information indicating a location associated with a user that sent the data.

7. The method of claim 1, wherein receiving the data comprises receiving a stream of links, the method further comprising:
filtering the links to select a subset of the links;
retrieving syndicated content items for the links in the subset; and
declining to retrieve syndicated content items for links not in the subset.

8. The method of claim 1, further comprising:
in response to determining that the particular syndicated content item associated with the particular web page is not in the repository,
accessing the particular web page, and
retrieving the particular syndicated content item based on accessing the particular web page.

9. The method of claim 8, wherein retrieving the particular syndicated content item based on accessing the particular web page comprises retrieving the particular syndicated content item from a portion of the particular web page, where the portion is defined by a microformat syntax.

10. The method of claim 8, wherein retrieving the particular syndicated content item based on accessing the particular web page comprises retrieving a given link to the particular syndicated content item from the particular web page, and using the given link to retrieve the particular syndicated content item.

11. The method of claim 1, wherein receiving the data comprises receiving the data subject to filtering applied against metadata associated with the link, wherein the filtering is based on at least one filtering rule.

12. The method of claim 1, wherein the repository contains the syndicated content items and links to the web pages associated with the respective syndicated content items.

13. The method of claim 1, wherein accessing the repository comprises accessing a reverse index in the repository, the reverse index mapping links to web pages with information of respective syndicated content items, and wherein accessing the reverse index using the link identifying the particular web page causes retrieval of the particular syndicated content item from the repository.

14. The method of claim 1, wherein the syndicated content format is one of a Really Simple Syndication (RSS) format, an Atom format, a Resource Description framework (RDF) format, and a NewsML format.

15. An article comprising at least one non-transitory machine-readable storage medium storing instructions that upon execution cause a first device to:
receive data over a network from a second device, where the data contains a link identifying a particular web page;
access a repository of syndicated content items associated with respective web pages to locate a particular syndicated content item associated with the particular web page identified by the link, the repository mapping the syndicated content items to the respective web pages, the syndicated content items being according to a syndicated content format; and
if the particular syndicated content item associated with the particular web page is in the repository, retrieve the particular syndicated content item from the repository, where the particular syndicated content item is according to the syndicated content format, and send the retrieved particular syndicated content item to a third device for display at the third device, wherein the first, second, and third devices are separate devices.

16. The article of claim 15, wherein receiving the data includes receiving a stream of links each associated with metadata, and wherein the instructions upon execution cause the first device to further:
    apply at least one filtering rule against the metadata of each of the links;
    identify a subset of the links for which corresponding syndicated content items are to be retrieved; and
    identify a remainder of the links for which corresponding syndicated content items are not to be retrieved.

17. The article of claim 15, wherein the link in the received data refers to the particular web page located at a device that is different from the second device.

18. The article of claim 15, wherein the particular syndicated content item comprises one of a Really Simple Syndication (RSS) feed, an Atom feed, a Resource Description framework (RDF) feed, and a NewsML feed.

19. The article of claim 15, wherein the instructions upon execution further cause the first device to:
    in response to determining that the particular syndicated content item associated with the particular web page is not in the repository,
    access the particular web page, and
    retrieve the particular syndicated content item based on accessing the particular web page.

20. The article of claim 15, wherein accessing the repository comprises accessing a reverse index in the repository, the reverse index mapping links to web pages with information of respective syndicated content items, and wherein accessing the reverse index using the link identifying the particular web page causes retrieval of the particular syndicated content item from the repository.

21. A server device comprising:
    an interface to receive social networking data from a social networking site, the social networking data containing links to respective web pages; and
    at least one processor configured to:
        filter the links to identify a subset of the links;
        for each link in the subset, access a reverse index in a repository of syndicated content items associated with respective web pages to retrieve a corresponding syndicated content item, the repository mapping the syndicated content items to the respective web pages, and the syndicated content items being according to a syndicated content item format, the reverse index mapping links to web pages with information of respective syndicated content items, and wherein accessing the reverse index using a link identifying a given web page causes retrieval of a corresponding syndicated content item from the repository; and
        send the syndicated content items corresponding to the links in the subset and retrieved from the repository to a client device for display at the client device, the sent syndicated content items being according to the syndicated content item format.

22. The server device of claim 21, wherein the filtering is based on metadata associated with the links, and the metadata includes one or both of hashtags and location information in the received social networking data.

23. The server device of claim 21, wherein the at least one processor is to decline to retrieve syndicated content items corresponding to links not in the subset.

24. A method of a client device, comprising:
    receiving data over a network from a first device, the data including a link identifying a particular web page;
    sending a request for syndicated content relating to the particular web page, to a server device having access to a repository of syndicated content items associated with respective web pages, wherein the client device, the first device, and the server device are separate devices, and wherein the repository maps the syndicated content items to the respective web pages, the syndicated content items being according to a syndicated content format;
    receiving, from the server device, a syndicated content item associated with the particular web page and retrieved by the server device from the repository, the received syndicated content item being according to the syndicated content item format; and
    outputting the received syndicated content item for display.

25. The method of claim 24, wherein the repository comprises a reverse index, the reverse index mapping links to web pages with information of respective syndicated content items, and wherein access of the reverse index using the link identifying the particular web page causes retrieval of the syndicated content item associated with the particular web page from the repository.

* * * * *